(12) United States Patent
Tsai et al.

(10) Patent No.: US 10,980,074 B2
(45) Date of Patent: Apr. 13, 2021

(54) APPARATUSES AND METHODS FOR SUPPORTING DUAL TALK OF MULTIPLE SUBSCRIBER IDENTITIES

(71) Applicant: MEDIATEK INC., Hsinchu (TW)

(72) Inventors: Chih-Yuan Tsai, Hsinchu (TW); Wei-Chiang Peng, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 92 days.

(21) Appl. No.: 16/458,361

(22) Filed: Jul. 1, 2019

(65) Prior Publication Data
US 2020/0015303 A1    Jan. 9, 2020

Related U.S. Application Data

(60) Provisional application No. 62/693,492, filed on Jul. 3, 2018.

(51) Int. Cl.
| | | |
|---|---|---|
| *H04W 76/15* | (2018.01) | |
| *H04W 80/10* | (2009.01) | |
| *H04W 8/18* | (2009.01) | |
| *H04L 29/06* | (2006.01) | |

(52) U.S. Cl.
CPC .......... *H04W 76/15* (2018.02); *H04W 8/183* (2013.01); *H04W 80/10* (2013.01); *H04L 65/1016* (2013.01)

(58) Field of Classification Search
None
See application file for complete search history.

(56) References Cited

U.S. PATENT DOCUMENTS

| | | | | |
|---|---|---|---|---|
| 9,775,082 | B1* | 9/2017 | Chakraborty | H04W 36/0094 |
| 2016/0142998 | A1* | 5/2016 | Tsai | H04W 36/30 455/458 |
| 2017/0171902 | A1* | 6/2017 | Tillman | H04W 8/24 |
| 2017/0374607 | A1* | 12/2017 | Wu | H04W 88/10 |
| 2018/0227960 | A1* | 8/2018 | Belghoul | H04W 72/1268 |
| 2020/0389823 | A1 | 12/2020 | Xu et al. | |

FOREIGN PATENT DOCUMENTS

WO    2018/182240 A1    10/2018

OTHER PUBLICATIONS

Chinese language office action dated Dec. 31, 2020, issued in application No. TW 109117366.

* cited by examiner

*Primary Examiner* — Brian S Roberts
(74) *Attorney, Agent, or Firm* — McClure, Qualey & Rodack, LLP

(57) ABSTRACT

A mobile communication device including a first RF device, a second RF device, and a controller is provided. The first RF device performs wireless transmission and reception utilizing a first RAT. The second RF device performs wireless transmission and reception utilizing a second RAT. The controller uses a first subscriber identity to make a first call or conduct a first data session via the first RF device, determines whether a dual connectivity on the first RAT and the second RAT is supported in response to a request for using a second subscriber identity to start a second call or a second data session via the second RF device, and allows the second call or the second data session to start during the first call or the first data session in response to the dual connectivity on the first RAT and the second RAT being supported.

18 Claims, 13 Drawing Sheets

APPARATUSES AND METHODS FOR SUPPORTING DUAL TALK OF MULTIPLE SUBSCRIBER IDENTITIES

CROSS REFERENCE TO RELATED APPLICATIONS

This Application claims priority of U.S. Provisional Application No. 62/693,492, filed on Jul. 3, 2018, the entirety of which is incorporated by reference herein.

BACKGROUND OF THE APPLICATION

Field of the Application

The application generally relates to multi-Subscriber Identity Module (SIM) coordination, and more particularly, to apparatuses and methods for supporting dual active of multiple subscriber identities.

Description of the Related Art

With growing demand for ubiquitous computing and networking, various Radio Access Technologies (RATs) have been developed, such as Global System for Mobile communications (GSM) technology, General Packet Radio Service (GPRS) technology, Enhanced Data rates for Global Evolution (EDGE) technology, Universal Mobile Telecommunications System (UMTS) technology, Interim Standard 95 (IS-95) technology, Code Division Multiple Access 2000 (CDMA-2000) technology, CDMA-2000 1× Evolution-Data Optimized or Evolution-Data (CDMA-2000 1× EV-DO) technology, Time Division-Synchronous Code Division Multiple Access (TD-SCDMA) technology, Worldwide Interoperability for Microwave Access (WiMAX) technology, Long Term Evolution (LTE) technology, Long Term Evolution-Advanced (LTE-A) technology, Time-Division LTE (TD-LTE) technology, New Radio (NR) technology, and others. In particular, GSM/GPRS/EDGE technology is also called 2G cellular technology; WCDMA/CDMA-2000/TD-SCDMA technology is also called 3G cellular technology; LTE/LTE-A/TD-LTE technology is also called 4G cellular technology; and NR technology is also called 5G cellular technology.

Generally, a cellular phone (which may also be referred to as a User Equipment (UE) or Mobile Station (MS)) only supports one RAT and provides the user with flexible mobile communications at all times via the supported RAT using a single subscriber identity card (which provides a single subscriber identity). However, to an increasing extent, more and more people find that having an additional subscriber identity card (which provides an additional subscriber identity) is a good way to reduce their mobile service charges (including voice and/or data services), or to separate personal and business phone calls. In order to alleviate the burden of carrying two cellular phones for two separate subscriber identity cards, so-called dual-card cellular phones have been developed, which generally support one or more RATs for respective mobile services using an individual subscriber identity card. The dual-card design allows calls to be made or received on either subscriber identity amid other mobile services.

Generally, for cost reduction, most dual-card cellular phones are equipped with a single Radio Frequency (RF) device. Due to the single RF device being shared by the transmission/reception operations associated with two separate subscriber identities, only one subscriber identity is allowed to occupy the single RF device for transmission/reception operations at any given time. That is, if a call request for one subscriber number is received while another call is already active on the other subscriber number, the latter call will be missed.

BRIEF SUMMARY OF THE APPLICATION

The present application proposes to leverage the feature of Evolved-Universal Terrestrial Radio Access (E-UTRA)-NR Dual Connectivity (EN-DC), NR-EUTRA Dual Connectivity (NE-DC), or Next Generation EN-DC (NGEN-DC), which is generally applied to single-card cellular phones, for supporting dual active on dual-card cellular phones. Specifically, in a conventional application of EN-DC/NE-DC/NGEN-DC, a cell phone may have dual connectivity with a 5G network and a 4G network simultaneously using one subscriber identity. By contrast, in the present application, the dual connectivity with a 5G network and a 4G network for a single subscriber identity is divided into single connectivity with a 5G network for one subscriber identity and single connectivity with a 4G network for another subscriber identity.

In one aspect of the application, a mobile communication device comprising a first RF device, a second RF device, and a controller is provided. The first RF device is configured to perform wireless transmission and reception utilizing a first RAT. The second RF device is configured to perform wireless transmission and reception utilizing a second RAT. The controller is configured to use a first subscriber identity to make a first call or conduct a first data session via the first RF device, determine whether a dual connectivity on the first RAT and the second RAT is supported in response to a request for using a second subscriber identity to start a second call or a second data session via the second RF device, and allow the second call or the second data session to start during the first call or the first data session in response to the dual connectivity on the first RAT and the second RAT being supported.

In another aspect of the application, a method for supporting dual active of multiple subscriber identities, executed by a mobile communication device which comprises a first RF device utilizing a first RAT and second RF device utilizing a second RAT, is provided. The method comprises the steps of: using a first subscriber identity to make a first call or conduct a first data session via the first RF device; determining whether a dual connectivity on the first RAT and the second RAT is supported in response to a request for using a second subscriber identity to start a second call or a second data session via the second RF device; and allowing the second call or the second data session to start during the first call or the first data session in response to the dual connectivity on the first RAT and the second RAT being supported.

In yet another aspect of the application, a non-transitory computer-readable storage medium comprising computer program that, when executed, causes a mobile communication device comprising a first RF device utilizing a first RAT and a second RF device utilizing a second RAT to perform a method for supporting dual active of multiple subscriber identities. The method comprises the steps of: using a first subscriber identity to make a first call or conduct a first data session via the first RF device; determining whether a dual connectivity on the first RAT and the second RAT is supported in response to a request for using a second subscriber identity to start a second call or a second data session via the second RF device; and allowing the second call or the second data session to start during the first call or the first data session in response to the dual connectivity on the first RAT and the second RAT being supported.

Other aspects and features of the present application will become apparent to those with ordinarily skill in the art upon review of the following descriptions of specific embodiments of the mobile communication devices, the non-transitory computer-readable storage media, and the methods for supporting dual active of multiple subscriber identities.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
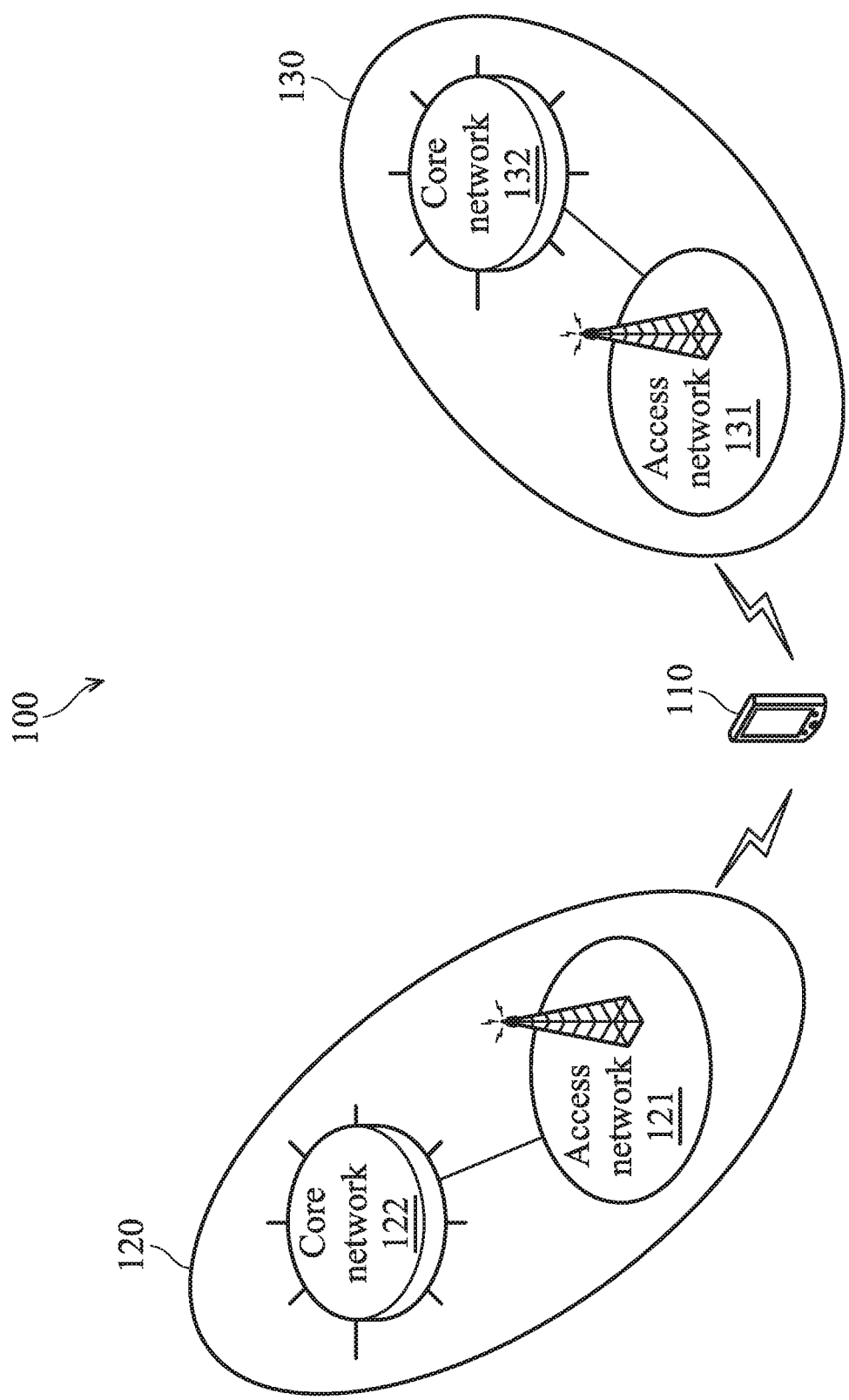
FIG. 1 is a block diagram of a wireless communication environment according to an embodiment of the application.

FIG. 1 is a block diagram of a wireless communication environment according to an embodiment of the application.

As shown in FIG. 1, the wireless communication environment 100 includes a mobile communication device 110 and two service networks 120 and 130.

The mobile communication device 110 may be referred to as a User Equipment (UE) or Mobile Station (MS), such as a feature phone, a smartphone, a panel Personal Computer (PC), a laptop computer, or any computing device supporting the RATs utilized by the service networks 120 and 130.

The mobile communication device 110 may wirelessly communicate with the service networks 120 and 130 using two separate subscriber identities.

The subscriber identities may be provided by one or two subscriber identity cards (not shown) in compliance with the specifications of the RAT utilized by the service networks 120 and 130. For example, the subscriber identity cards may include a Subscriber Identity Module (SIM) card if one of the service networks 120 and 130 is a GSM/GPRS/EDGE/IS-95 network, or may include a Universal SIM (USIM) card if one of the service networks 120 and 130 is a WCDMA/LTE/LTE-A/TD-LTE/NR network.

Alternatively, the subscriber identities may be directly written into the mobile communication device 110, without the need for any socket to insert any subscriber identity card, or the subscriber identities may be provided by one or more virtual subscriber identity cards (e.g., eSIM/eUSIM), and the present application is not limited thereto.

The service network 120 is a legacy cellular network, while the service network 130 is an advanced cellular network. For example, the service network 120 may be a 4G network, while the service network 130 may be a 5G network. Alternatively, the service network 120 may be a 2G network (e.g., GSM/GPRS/EDGE/IS-95 network) or a 3G network (e.g., WCDMA/CDMA-2000/TD-SCDMA network, while the service network 130 may be a 4G network (e.g., LTE/LTE-A/TD-LTE network), and the present application should not be limited thereto.

The service network 120 includes an access network 121 and a core network 122, and the service network 130 includes an access network 131 and a core network 132. Each of the access networks 121 and 131 is responsible for processing radio signals, terminating radio protocols, and connecting the mobile communication device 110 with the core network 122 or 132, while each of the core networks 122 and 132 is responsible for performing mobility management, network-side authentication, and interfaces with public/external networks (e.g., the Internet).

The access networks 121 and 131 and the core networks 122 and 132 may each include one or more network nodes for carrying out said functions. For example, if the service network 120 is a GSM/GPRS/EDGE network, the access network 121 may be a GSM EDGE Radio Access Network (GERAN) which includes at least a Base Transceiver Station (BTS) and a Base Station Controller (BSC), and the core network 122 may be a GPRS core which includes at least a Mobile Switching Center (MSC), Home Location Register (HLR), Serving GPRS Support Node (SGSN), and Gateway GPRS Support Node (GGSN).

If the service network 120 is a WCDMA network, the access network 121 may be a Universal Terrestrial Radio Access Network (UTRAN) and the core network 122 may be a General Packet Radio Service (GPRS) core which includes a Home Location Register (HLR), at least one Serving GPRS Support Node (SGSN), and at least one Gateway GPRS Support Node (GGSN).

If the service network 120 or 130 is an LTE/LTE-A/TD-LTE network, the access network 121 or 131 may be an Evolved-UTRAN (E-UTRAN) which includes at least an evolved NB (eNB) (e.g., a macro eNB, femto eNB, or pico eNB), and the core network 122 or 132 may be an Evolved Packet Core (EPC) which includes a Home Subscriber Server (HSS), Mobility Management Entity (MME), Serving Gateway (S-GW), Packet Data Network Gateway (PDN-GW or P-GW), and IP Multimedia Subsystem (IMS) server.

If the service network 130 is an NR network, the access network 131 may be a Next Generation Radio Access Network (NG-RAN) which includes at least a gNB or Transmission Reception Point (TRP), and the core network 132 may be a Next Generation Core Network (NG-CN) which includes various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session.

The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

In one embodiment, the service network 130 (e.g., a 5G network) may be deployed in the Non-Standalone (NSA) architecture which depends on the control plane of the service network 120 (e.g., a 4G network) for control functions, while the service network 130 is exclusively focused on user plane. The NSA architecture may support Evolved-Universal Terrestrial Radio Access (E-UTRA)-NR Dual Connectivity (EN-DC), NR-EUTRA Dual Connectivity (NE-DC), or Next Generation EN-DC (NGEN-DC), which allows the mobile communication device 110 to be able to have dual connectivity with both the service networks 120 and 130 simultaneously.

Although not shown, the service networks 120 and 130 may support interworking with specific communication interface(s). For example, there may be an interface connecting the NG-RAN of an NR network (e.g., the service network 130) to the EPC of an LTE network (e.g., the service network 120), or an interface connecting the E-UTRAN of an LTE network (e.g., the service network 120) to the NG-CN of an NR network (e.g., the service network 130), or an interface connecting the E-UTRAN of an LTE network (e.g., the service network 120) to the NG-RAN of an NR network (e.g., the service network 130).

It should be understood that wireless communication environment 100 is for illustrative purposes only and is not intended to limit the scope of the application. For example, the present application could be applied to other RATs, as long as the RATs utilized by the service networks 120 and 130 support dual connectivity.

Figure 2:
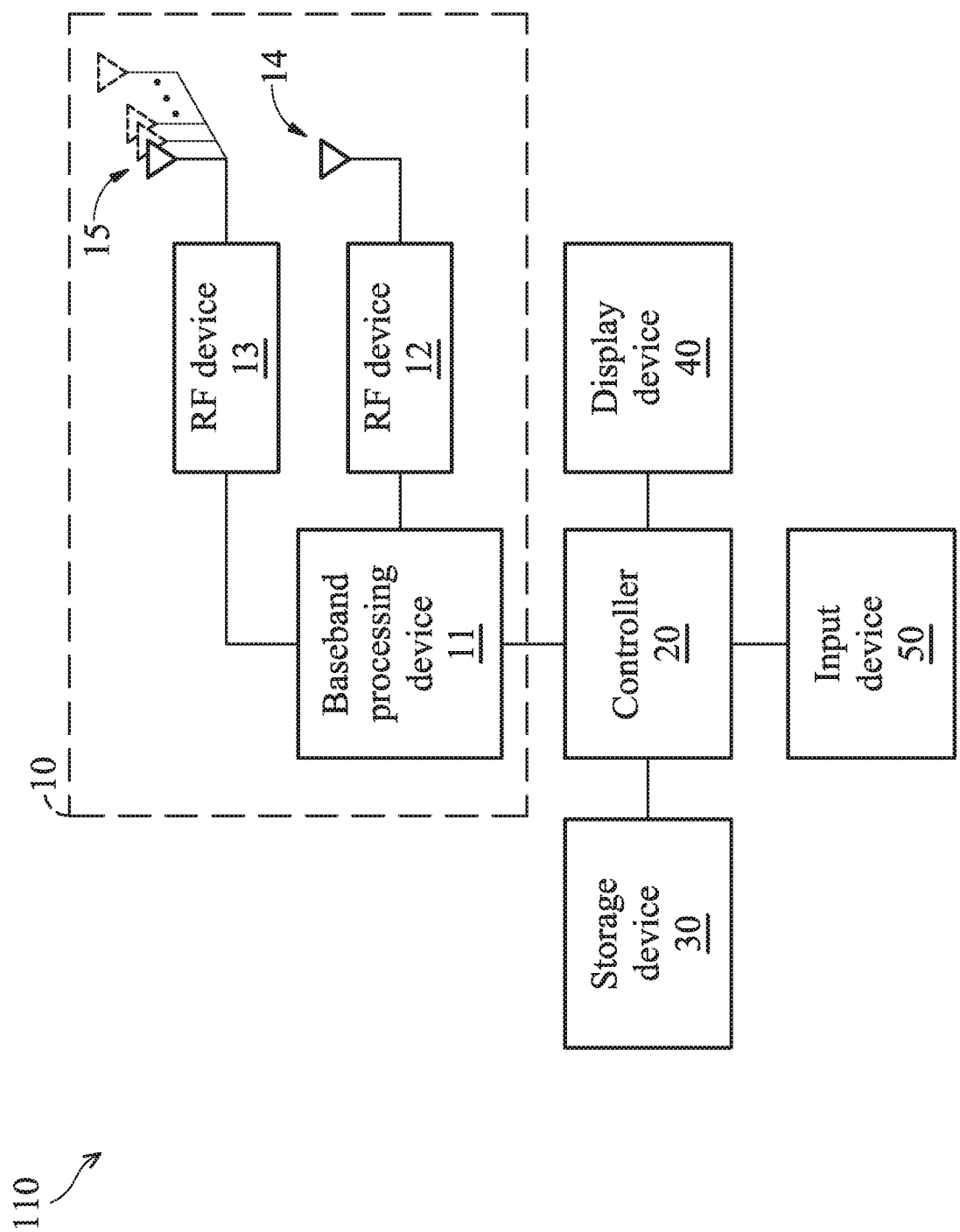
FIG. 2 is a block diagram illustrating the mobile communication device 110 according to an embodiment of the application.

FIG. 2 is a block diagram illustrating the mobile communication device 110 according to an embodiment of the application.

As shown in FIG. 2, the mobile communication device 110 includes a wireless transceiver 10, a controller 20, a storage device 30, a display device 40, and an Input/Output (I/O) device 50.

The wireless transceiver 10 is configured to perform wireless transmission and reception to and from the cells formed by the service networks 120 and 130 using two subscriber identities. Particularly, the wireless transceiver 10 includes two sets of RF device and antenna for supporting the feature of EN-DC, NE-DC, or NGEN-DC.

Specifically, the wireless transceiver 10 includes a baseband processing device 11, two RF devices 12 and 13, and two antennas 14 and 15, wherein the baseband processing device 11 controls the RF device 12 and the antenna 14 for wireless transceiving with the service network 120, and the baseband processing device 11 controls the RF device 13 and the antenna 15 (which may include an antenna array for beamforming) for wireless transceiving with the service network 130.

To further clarify, the baseband processing device 11 is configured to perform baseband signal processing and control the communications between multiple subscriber identity cards (not shown) and the RF devices 12 and 13. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

In one embodiment, a dual-card controller (not shown) may be coupled between the baseband processing device 11 and multiple subscriber identity cards (not shown) for powering the subscriber identity cards with the same or different voltage levels according to the requirements thereof by a Power Management Integrated Chip (PMIC) and a battery, wherein the voltage level for each subscriber identity card is determined during initiation. The baseband processing device 11 may read data from each of the subscriber identity cards, and writes data to one of the subscriber identity cards via the dual-card controller. In addition, the dual-card controller selectively transfers clocks, resets, and/or data signals to the subscriber identity cards according to instructions issued by the baseband processing device 11.

In another embodiment, the baseband processing device 11 may include multiple interfaces (not shown) which independently handle the connections to multiple subscriber identity cards (not shown).

The RF devices 12 and 13 may receive RF wireless signals via the antennas 14 and 15, respectively, convert the received RF wireless signals to baseband signals, which are processed by the baseband processing device 11, or receive baseband signals from the baseband processing device 11 and convert the received baseband signals to RF wireless signals, which are later transmitted via the antennas 14 and 15, respectively. Each of the RF devices 12 and 13 may contain multiple hardware devices to perform radio frequency conversion. For example, each of the RF devices 12 and 13 may include a mixer to multiply the baseband signals with a carrier oscillated in the radio frequency of the supported RAT, wherein the radio frequency may be 900 MHz, 1800 MHz or 1900 MHz utilized in GSM/EDGE/GPRS technology, or may be 900 MHz, 1900 MHz or 2100 MHz utilized in WCDMA technology, or may be 850 MHz, 1900 MHz, or 2100 MHz utilized in IS-95/CDMA-2000/ CDMA-2000 1× EV-DO technology, or may be 900 MHz, 2100 MHz, or 2.6 GHz utilized in LTE/LTE-A/TD-LTE technology, or any radio frequency (e.g., 30 GHz-300 GHz for mmWave) utilized in 5G (e.g., NR) technology, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the function of data processing and computing, controlling the wireless transceiver 10 for coordinating the communication operations associated with two separate subscriber identities provided by two separate subscriber identity cards, storing and retrieving data to and from the storage device 30, sending a series of frame data (e.g. representing text messages, graphics, images, etc.) to the display device 40, and receiving signals from the I/O device 50.

Particular, the controller 20 is responsible for coordinating the aforementioned operations of the wireless transceiver 10, the storage device 30, the display device 40, and the I/O device 50 for performing the method for supporting dual active of multiple subscriber identities.

In another embodiment, the controller 20 may be incorporated into the baseband processing device 11, serving as a baseband processor.

As will be appreciated by persons skilled in the art, the circuits of the controller 20 will typically include transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of applications, communication protocols, and/or the method of the present application.

The display device 40 may be a Liquid-Crystal Display (LCD), Light-Emitting Diode (LED) display, Organic LED (OLED) display, or Electronic Paper Display (EPD), etc., for providing a display function. Alternatively, the display device 40 may further comprise one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., serving as the Man-Machine Interface (MMI) for interaction with users.

It should be understood that the components described in the embodiment of FIG. 2 are for illustrative purposes only and are not intended to limit the scope of the application. For example, the mobile communication device 110 may further include a Wireless-Fidelity (Wi-Fi) device for providing a short-range wireless communication function, a Global Positioning System (GPS) device for use of some location-based services or applications, and/or power, etc. Alternatively, the mobile communication device 110 may include fewer components. For example, the mobile communication device 110 may not include the display device 40 and/or the I/O device 50.

Figure 3:
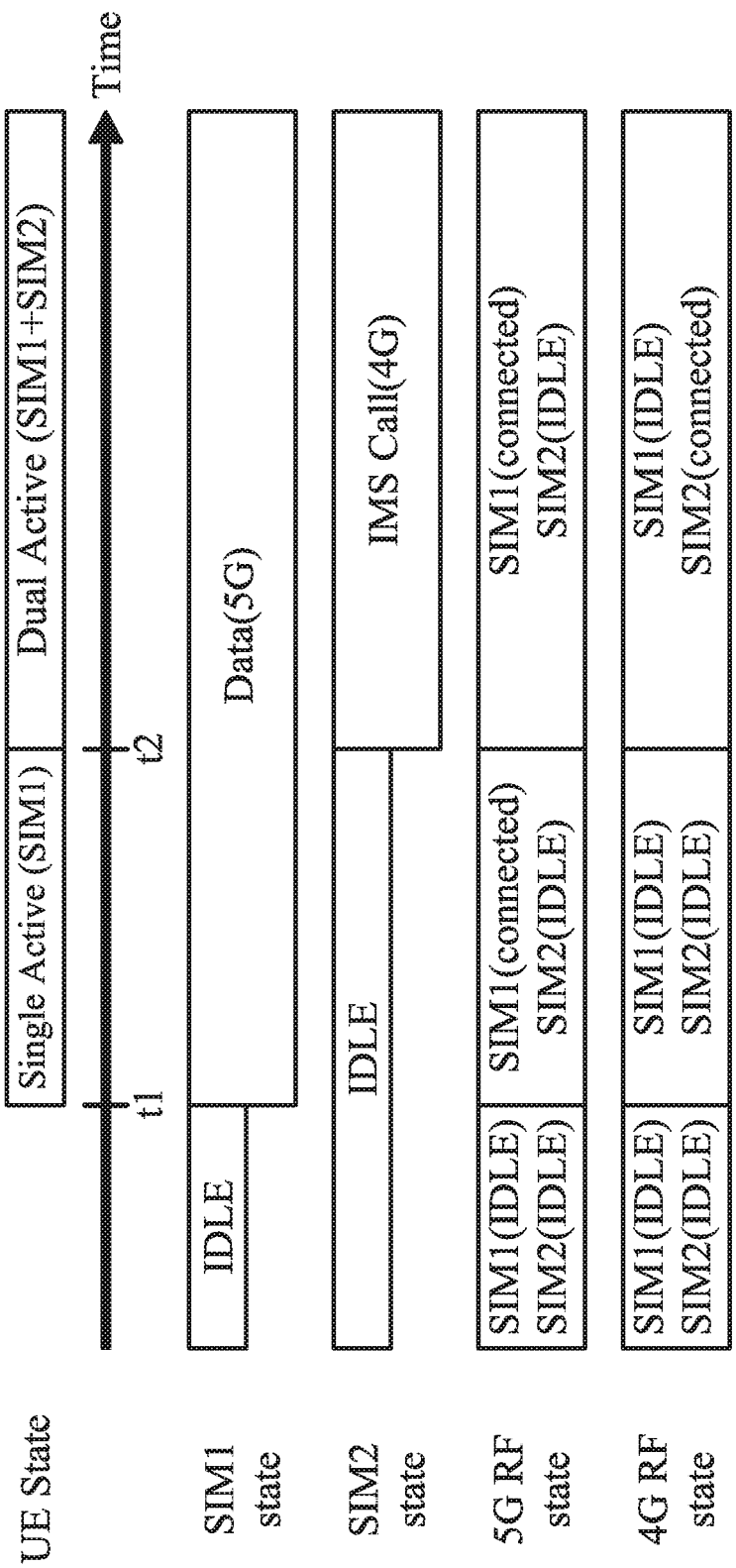
FIG. 3 is a block diagram illustrating the communication operations associated with two separate subscriber identities in the mobile communication device 110 according to an embodiment of the application.

FIG. 3 is a block diagram illustrating the communication operations associated with two separate subscriber identities in the mobile communication device 110 according to an embodiment of the application.

As shown in FIG. 3, at time t1, the first subscriber identity (denoted as SIM1) is used to conduct a data session via the 5G RF device. Meanwhile, the second subscriber identity (denoted as SIM2) remains idle, and the mobile communication device 110 enters the single active mode with SIM1 (i.e., only the 5G RF device is active for SIM1). Specifically, the states of SIM1 in the 5G RF device and the 4G RF device are in CONNECTED mode and IDLE mode, respectively, and the states of SIM2 in the 5G RF device and the 4G RF device are both in IDLE mode.

At time t2, SIM2 is used to start an IP Multimedia Subsystem (IMS) call (also called Voice over LTE (VoLTE) call) via the 4G RF device during the ongoing data session associated with SIM1. In response, the mobile communication device 110 determines whether dual connectivity on 5G and 4G is supported.

The determination of whether dual connectivity on 5G and 4G is supported may be performed by determining whether the mobile communication device 110 supports EN-DC, NE-DC, or NGEN-DC. If the mobile communication device 110 supports EN-DC, NE-DC, or NGEN-DC, it means that dual connectivity on 5G and 4G is supported.

In this embodiment, it is assumed that dual connectivity on 5G and 4G is supported, so at time t2, the mobile communication device 110 enters the dual active mode with SIM1 for data session and SIM2 for IMS call (i.e., the 5G RF device is active for SIM1 and the 4G RF device is active for SIM2). That is, the feature of EN-DC, NE-DC, or NGEN-DC is extended to support dual active on separate subscriber identities. Meanwhile, the states of SIM1 in the 5G RF device and the 4G RF device are in CONNECTED mode and IDLE mode, respectively, and the states of SIM2 in the 5G RF device and the 4G RF device are in IDLE mode and CONNECTED mode, respectively.

Figure 4:
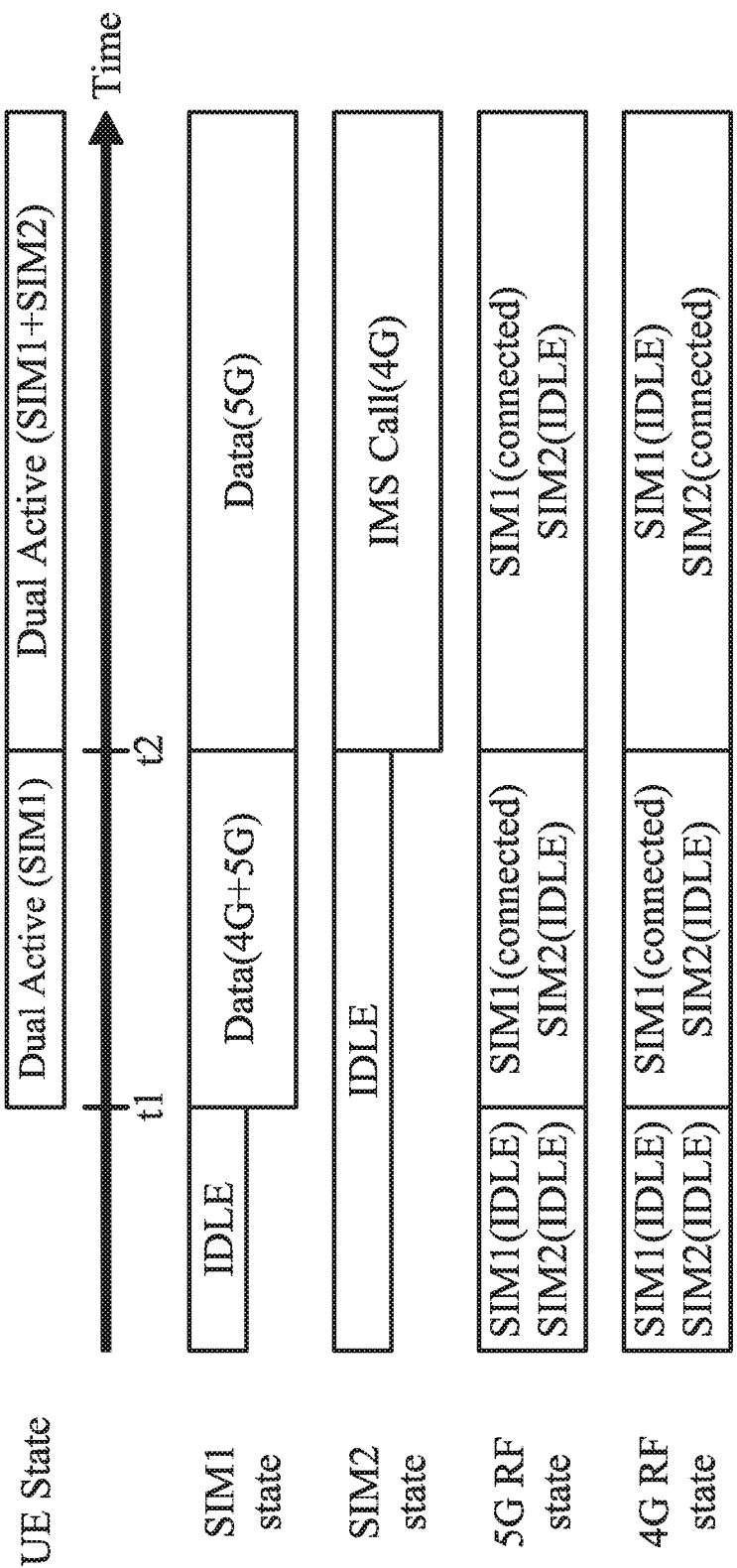
FIG. 4 is a block diagram illustrating the communication operations associated with two separate subscriber identities in the mobile communication device 110 according to another embodiment of the application.

FIG. 4 is a block diagram illustrating the communication operations associated with two separate subscriber identities in the mobile communication device 110 according to another embodiment of the application.

As shown in FIG. 4, at time t1, the first subscriber identity (denoted as SIM1) is used to conduct a data session via both the 5G RF device and the 4G RF device. That is, the feature of EN-DC, NE-DC, or NGEN-DC is used for the data session associated with SIM1.

Meanwhile, the second subscriber identity (denoted as SIM2) remains idle, and the mobile communication device 110 enters the dual active mode with SIM1 only (i.e., both the 5G RF device and the 4G RF device are active for SIM1). Specifically, the states of SIM1 in the 5G RF device and the 4G RF device are both in CONNECTED mode, and the states of SIM2 in the 5G RF device and the 4G RF device are both in IDLE mode.

At time t2, SIM2 is used to start an IMS call via the 4G RF device during the ongoing data session associated with SIM1. In response, the mobile communication device 110 switches to the dual active mode with SIM1 for data session and SIM2 for IMS call (i.e., the 5G RF device is active for SIM1 and the 4G RF device is active for SIM2). That is, the feature of EN-DC, NE-DC, or NGEN-DC is extended to support dual active on separate subscriber identities. Meanwhile, the states of SIM1 in the 5G RF device and the 4G RF device are in CONNECTED mode and IDLE mode, respectively, and the states of SIM2 in the 5G RF device and the 4G RF device are in IDLE mode and CONNECTED mode, respectively.

Figure 5:
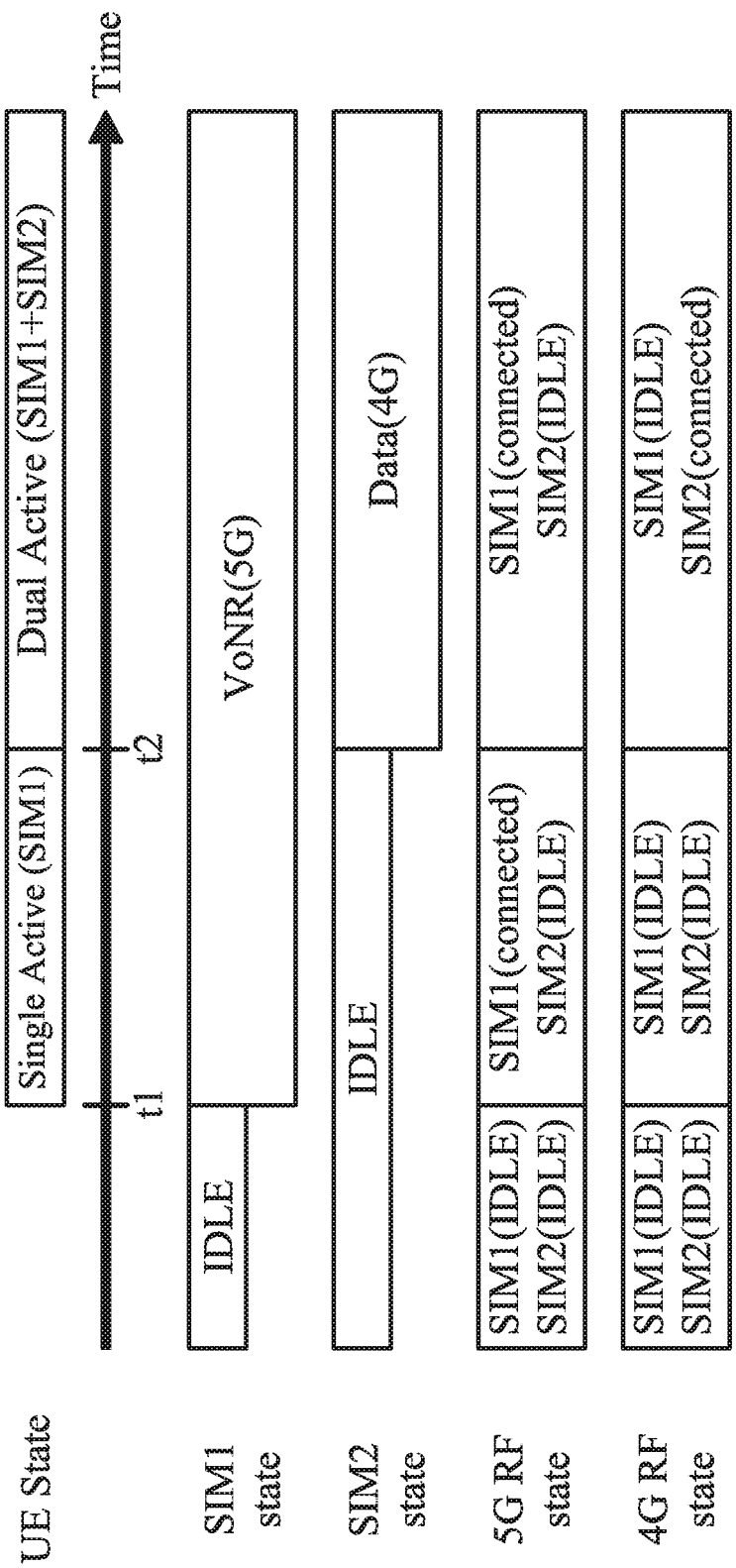
FIG. 5 is a block diagram illustrating the communication operations associated with two separate subscriber identities in the mobile communication device 110 according to another embodiment of the application.

FIG. 5 is a block diagram illustrating the communication operations associated with two separate subscriber identities in the mobile communication device 110 according to another embodiment of the application.

As shown in FIG. 5, at time t1, the first subscriber identity (denoted as SIM1) is used to make a Voice over NR (VoNR) call via the 5G RF device. Meanwhile, the second subscriber identity (denoted as SIM2) remains idle, and the mobile communication device 110 enters the single active mode with SIM1 (i.e., only the 5G RF device is active for SIM1). Specifically, the states of SIM1 in the 5G RF device and the 4G RF device are in CONNECTED mode and IDLE mode, respectively, and the states of SIM2 in the 5G RF device and the 4G RF device are both in IDLE mode.

At time t2, SIM2 is used to start a data session via the 4G RF device during the ongoing VoNR call associated with SIM1. In response, the mobile communication device 110 determines whether dual connectivity on 5G and 4G is supported.

The determination of whether dual connectivity on 5G and 4G is supported may be performed by determining whether the mobile communication device 110 supports EN-DC, NE-DC, or NGEN-DC. If the mobile communication device 110 supports EN-DC, NE-DC, or NGEN-DC, it means that dual connectivity on 5G and 4G is supported.

In this embodiment, it is assumed that dual connectivity on 5G and 4G is supported, so at time t2, the mobile communication device 110 enters the dual active mode with SIM1 for VoNR call and SIM2 for data session (i.e., the 5G RF device is active for SIM1 and the 4G RF device is active for SIM2). That is, the feature of EN-DC, NE-DC, or NGEN-DC is extended to support dual active on separate subscriber identities. Meanwhile, the states of SIM1 in the 5G RF device and the 4G RF device are in CONNECTED mode and IDLE mode, respectively, and the states of SIM2 in the 5G RF device and the 4G RF device are in IDLE mode and CONNECTED mode, respectively.

Figure 6:
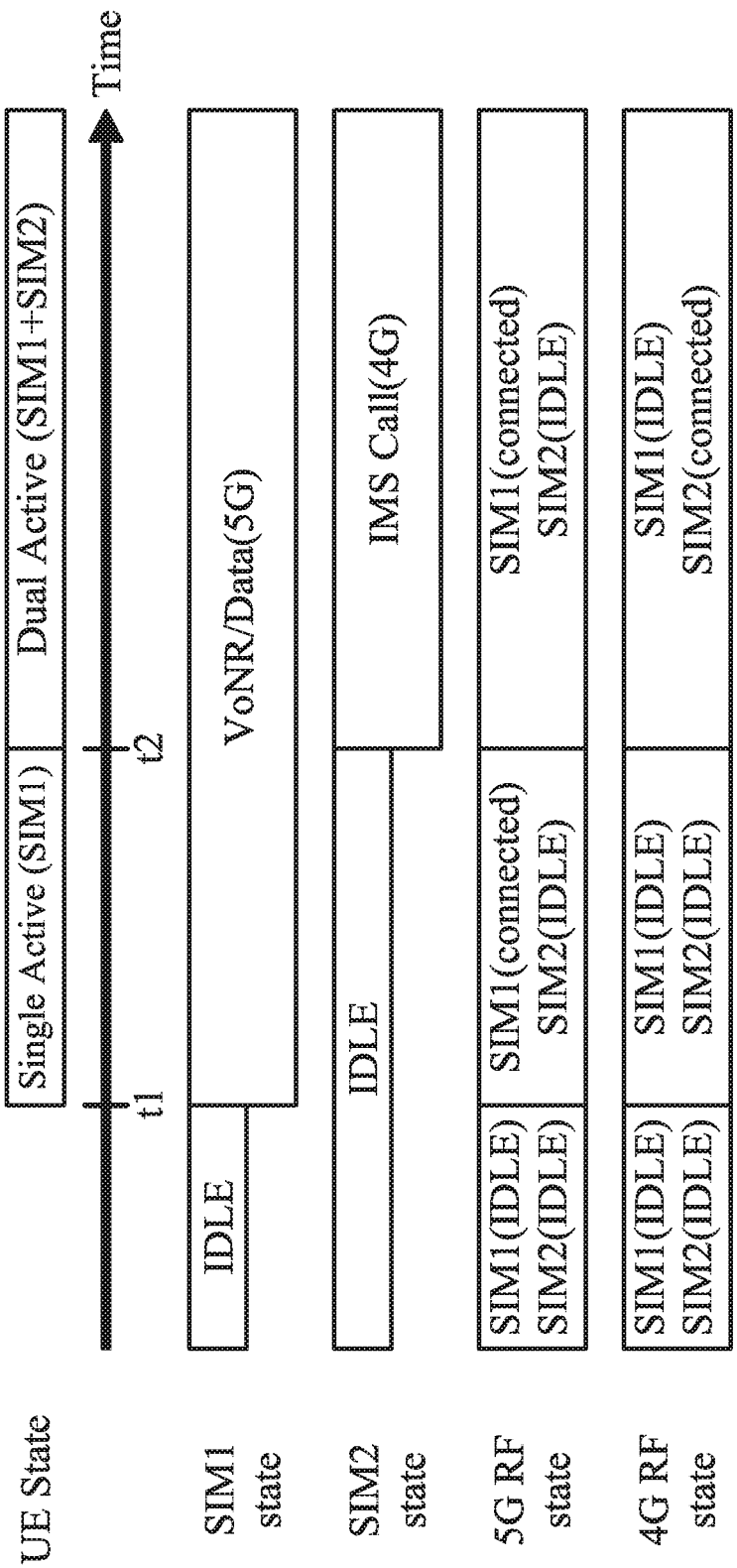
FIG. 6 is a block diagram illustrating the communication operations associated with two separate subscriber identities in the mobile communication device 110 according to another embodiment of the application.

FIG. 6 is a block diagram illustrating the communication operations associated with two separate subscriber identities in the mobile communication device 110 according to another embodiment of the application.

As shown in FIG. 6, at time t1, the first subscriber identity (denoted as SIM1) is used to make a Voice over NR (VoNR) call and/or conduct a data session via the 5G RF device. Meanwhile, the second subscriber identity (denoted as SIM2) remains idle, and the mobile communication device 110 enters the single active mode with SIM1 (i.e., only the 5G RF device is active for SIM1). Specifically, the states of SIM1 in the 5G RF device and the 4G RF device are in CONNECTED mode and IDLE mode, respectively, and the states of SIM2 in the 5G RF device and the 4G RF device are both in IDLE mode.

At time t2, SIM2 is used to start an IMS call via the 4G RF device during the ongoing VoNR call and/or data session associated with SIM1. In response, the mobile communication device 110 determines whether dual connectivity on 5G and 4G is supported.

The determination of whether dual connectivity on 5G and 4G is supported may be performed by determining whether the mobile communication device 110 supports EN-DC, NE-DC, or NGEN-DC. If the mobile communication device 110 supports EN-DC, NE-DC, or NGEN-DC, it means that dual connectivity on 5G and 4G is supported.

In this embodiment, it is assumed that dual connectivity on 5G and 4G is supported, so at time t2, the mobile communication device 110 enters the dual active mode with SIM1 for VoNR call and/or data session and SIM2 for IMS call (i.e., the 5G RF device is active for SIM1 and the 4G RF device is active for SIM2). That is, the feature of EN-DC, NE-DC, or NGEN-DC is extended to support dual active on separate subscriber identities. Meanwhile, the states of SIM1 in the 5G RF device and the 4G RF device are in CONNECTED mode and IDLE mode, respectively, and the states of SIM2 in the 5G RF device and the 4G RF device are in IDLE mode and CONNECTED mode, respectively.

Figure 7:
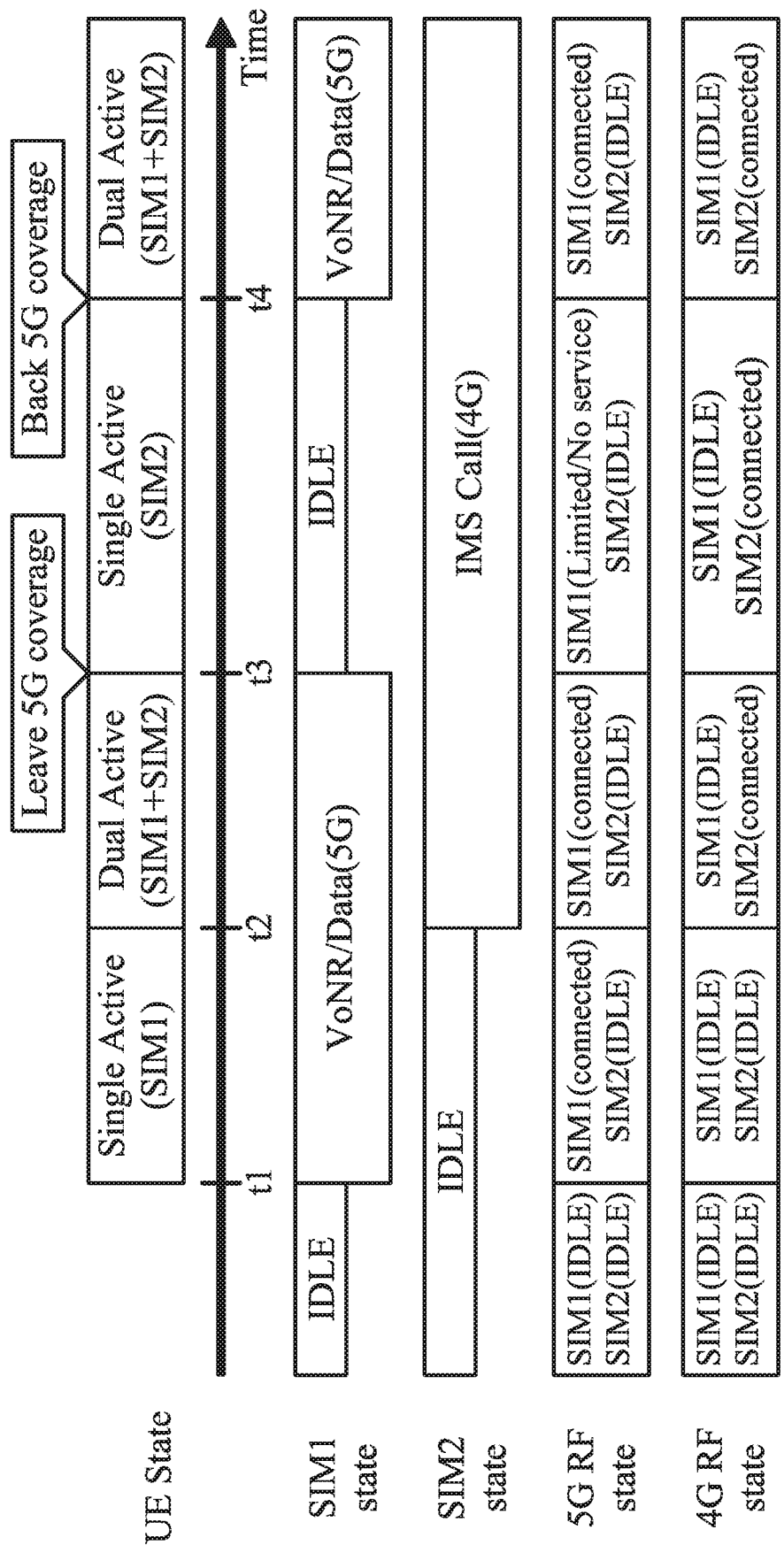
FIG. 7 is a block diagram illustrating the communication operations associated with two separate subscriber identities in the mobile communication device 110 according to another embodiment of the application.

FIG. 7 is a block diagram illustrating the communication operations associated with two separate subscriber identities in the mobile communication device 110 according to another embodiment of the application.

As shown in FIG. 7, at time t1, the first subscriber identity (denoted as SIM1) is used to make a VoNR call and/or conduct a data session via the 5G RF device. Meanwhile, the second subscriber identity (denoted as SIM2) remains idle, and the mobile communication device 110 enters the single active mode with SIM1 (i.e., only the 5G RF device is active for SIM1). Specifically, the states of SIM1 in the 5G RF device and the 4G RF device are in CONNECTED mode and IDLE mode, respectively, and the states of SIM2 in the 5G RF device and the 4G RF device are both in IDLE mode.

At time t2, SIM2 is used to start an IMS call via the 4G RF device during the ongoing VoNR call and/or data session associated with SIM1. In response, the mobile communication device 110 determines whether dual connectivity on 5G and 4G is supported.

The determination of whether dual connectivity on 5G and 4G is supported may be performed by determining whether the mobile communication device 110 supports EN-DC, NE-DC, or NGEN-DC. If the mobile communication device 110 supports EN-DC, NE-DC, or NGEN-DC, it means that dual connectivity on 5G and 4G is supported.

In this embodiment, it is assumed that dual connectivity on 5G and 4G is supported, so at time t2, the mobile communication device 110 enters the dual active mode with SIM1 for VoNR call and/or data session and SIM2 for IMS call (i.e., the 5G RF device is active for SIM1 and the 4G RF device is active for SIM2). That is, the feature of EN-DC, NE-DC, or NGEN-DC is extended to support dual active on separate subscriber identities. Meanwhile, the states of SIM1 in the 5G RF device and the 4G RF device are in CONNECTED mode and IDLE mode, respectively, and the states of SIM2 in the 5G RF device and the 4G RF device are in IDLE mode and CONNECTED mode, respectively.

At time t3, when loss of 5G coverage is detected via the 5G RF device, the VoNR call and/or data session associated with SIM1 is suspended/terminated, and the IMS call associated with SIM2 remains ongoing. Meanwhile, the states of SIM1 in the 5G RF device and the 4G RF device are in LIMITED/NO-SERVICE mode and IDLE mode, respectively, and the states of SIM2 in the 5G RF device and the 4G RF device are in IDLE mode and CONNECTED mode, respectively.

At time t4, when 5G coverage is recovered via the 5G RF device, the VoNR call and/or data session associated with SIM1 is resumed/restarted, and the IMS call associated with SIM2 remains ongoing. Meanwhile, the states of SIM1 in the 5G RF device and the 4G RF device are in CONNECTED mode and IDLE mode, respectively, and the states of SIM2 in the 5G RF device and the 4G RF device are in IDLE mode and CONNECTED mode, respectively.

Figure 8:
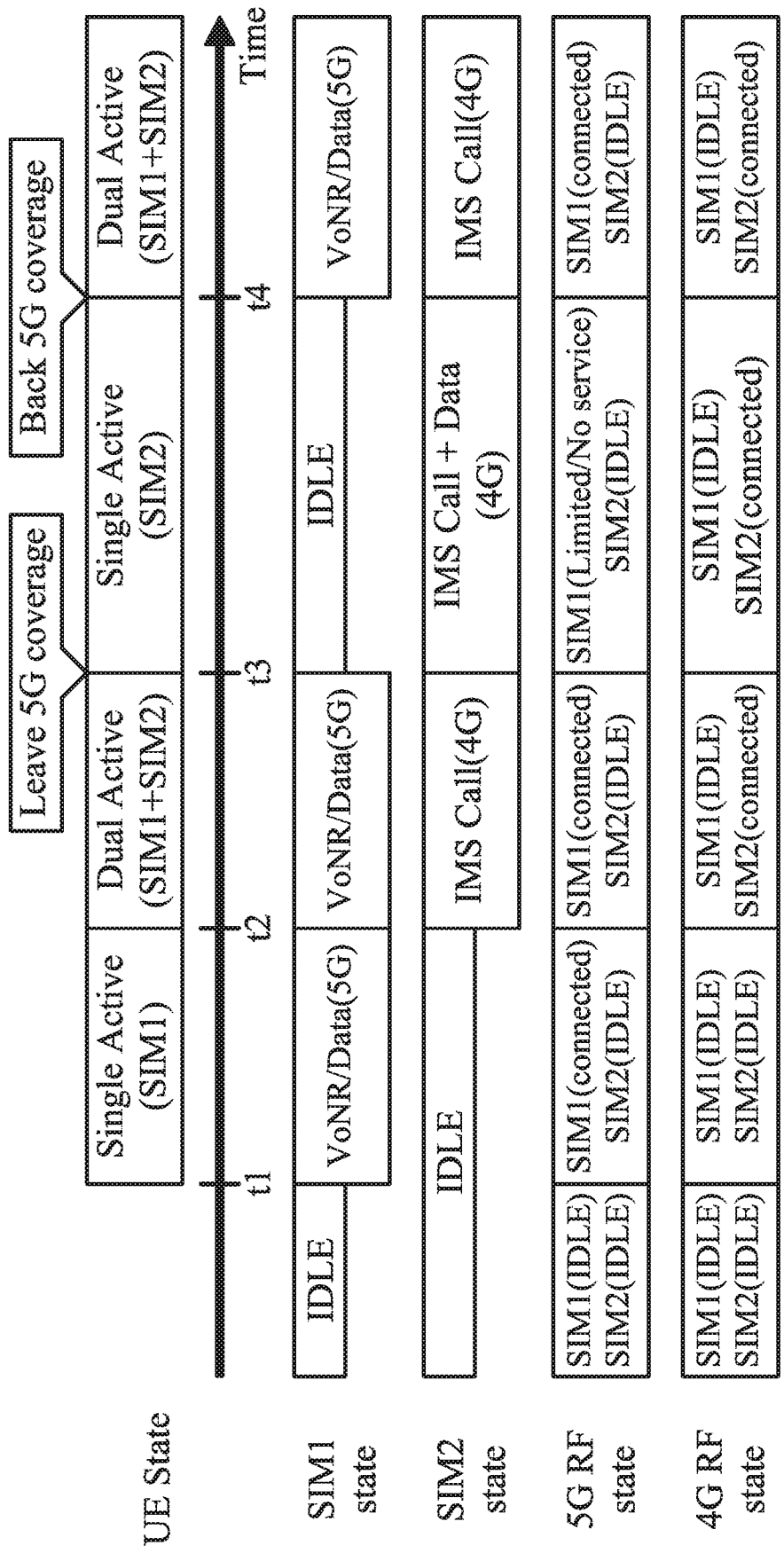
FIG. 8 is a block diagram illustrating the communication operations associated with two separate subscriber identities in the mobile communication device 110 according to another embodiment of the application.

FIG. 8 is a block diagram illustrating the communication operations associated with two separate subscriber identities in the mobile communication device 110 according to another embodiment of the application.

As shown in FIG. 8, at time t1, the first subscriber identity (denoted as SIM1) is used to make a VoNR call and/or conduct a data session via the 5G RF device. Meanwhile, the second subscriber identity (denoted as SIM2) remains idle, and the mobile communication device 110 enters the single active mode with SIM1 (i.e., only the 5G RF device is active for SIM1). Specifically, the states of SIM1 in the 5G RF device and the 4G RF device are in CONNECTED mode and IDLE mode, respectively, and the states of SIM2 in the 5G RF device and the 4G RF device are both in IDLE mode.

At time t2, SIM2 is used to start an IMS call via the 4G RF device during the ongoing VoNR call and/or data session associated with SIM1. In response, the mobile communication device 110 determines whether dual connectivity on 5G and 4G is supported.

The determination of whether dual connectivity on 5G and 4G is supported may be performed by determining whether the mobile communication device 110 supports EN-DC, NE-DC, or NGEN-DC. If the mobile communication device 110 supports EN-DC, NE-DC, or NGEN-DC, it means that dual connectivity on 5G and 4G is supported.

In this embodiment, it is assumed that dual connectivity on 5G and 4G is supported, so at time t2, the mobile communication device 110 enters the dual active mode with SIM1 for VoNR call and/or data session and SIM2 for IMS call (i.e., the 5G RF device is active for SIM1 and the 4G RF device is active for SIM2). That is, the feature of EN-DC, NE-DC, or NGEN-DC is extended to support dual active on separate subscriber identities. Meanwhile, the states of SIM1 in the 5G RF device and the 4G RF device are in CONNECTED mode and IDLE mode, respectively, and the states of SIM2 in the 5G RF device and the 4G RF device are in IDLE mode and CONNECTED mode, respectively.

At time t3, when loss of 5G coverage is detected via the 5G RF device, the VoNR call and/or data session associated with SIM1 is switched to SIM2, instead of being suspended/terminated, so that SIM2 is used to keep the IMS call ongoing and to continue the VoNR call and/or data session switched from SIM1. Meanwhile, the states of SIM1 in the 5G RF device and the 4G RF device are in LIMITED/NO-SERVICE mode and IDLE mode, respectively, and the states of SIM2 in the 5G RF device and the 4G RF device are in IDLE mode and CONNECTED mode, respectively.

At time t4, when 5G coverage is recovered via the 5G RF device, the VoNR call and/or data session is switched back to SIM1, and the IMS call associated with SIM2 remains ongoing. Meanwhile, the states of SIM1 in the 5G RF device and the 4G RF device are in CONNECTED mode and IDLE mode, respectively, and the states of SIM2 in the 5G RF device and the 4G RF device are in IDLE mode and CONNECTED mode, respectively.

Please note that, in contrast to the embodiment of FIG. 7, the VoNR call and/or data session associated with SIM1 is switched to be conducted with SIM2 when loss of 5G coverage is detected. Advantageously, the data service will not be suspended or terminated due to losing 5G coverage, instead, it will continue with the peer SIM. In one embodiment, this feature may be called "auto data switch", and may be enabled by the user of the mobile communication device 110. In other words, the "auto data switch" feature is disabled in the embodiment of FIG. 7.

Figure 9A:
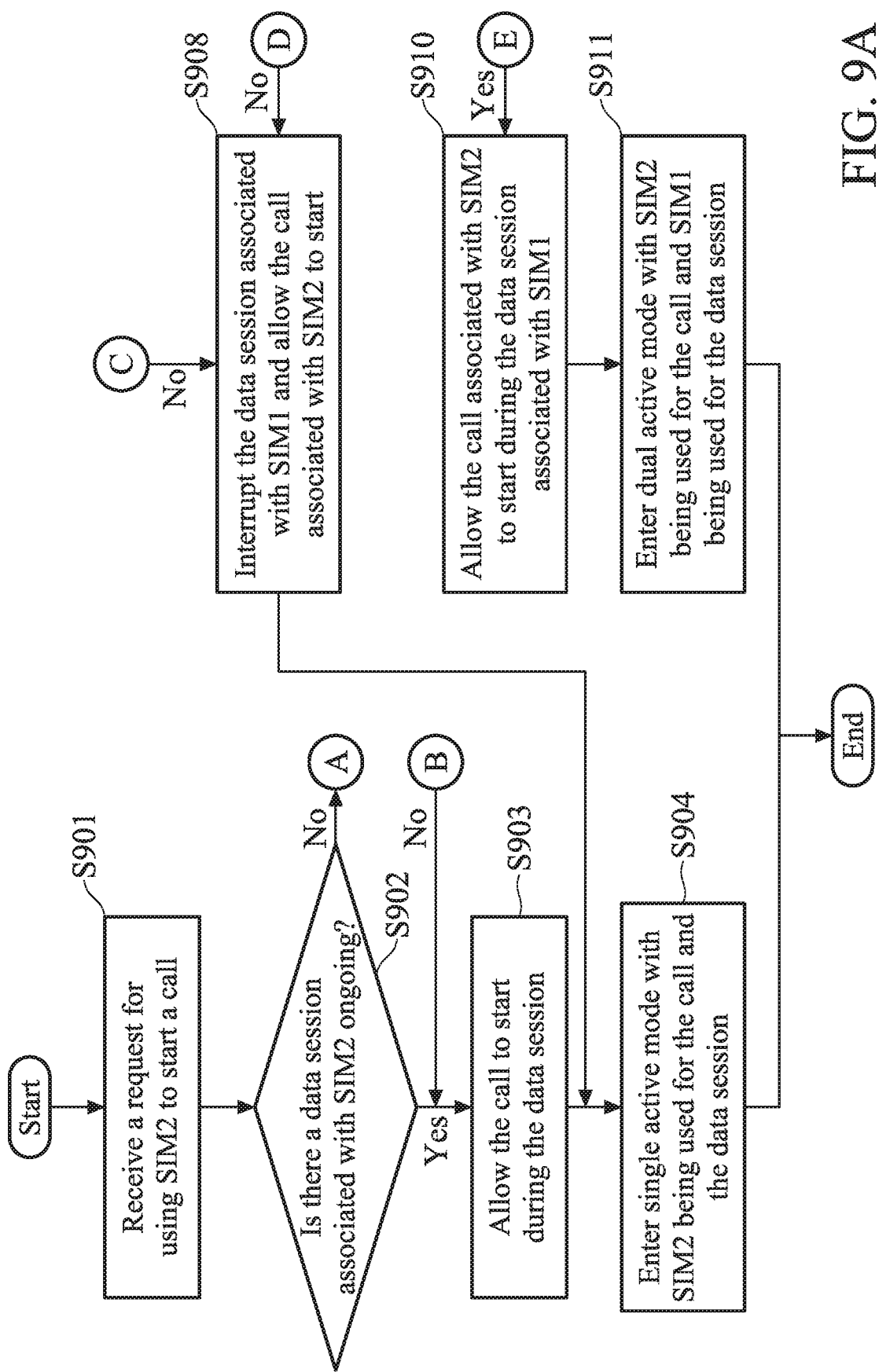
FIGS. 9A and 9B show a flow chart illustrating the method for supporting dual active of multiple subscriber identities according to an embodiment of the application.
Figure 9B:
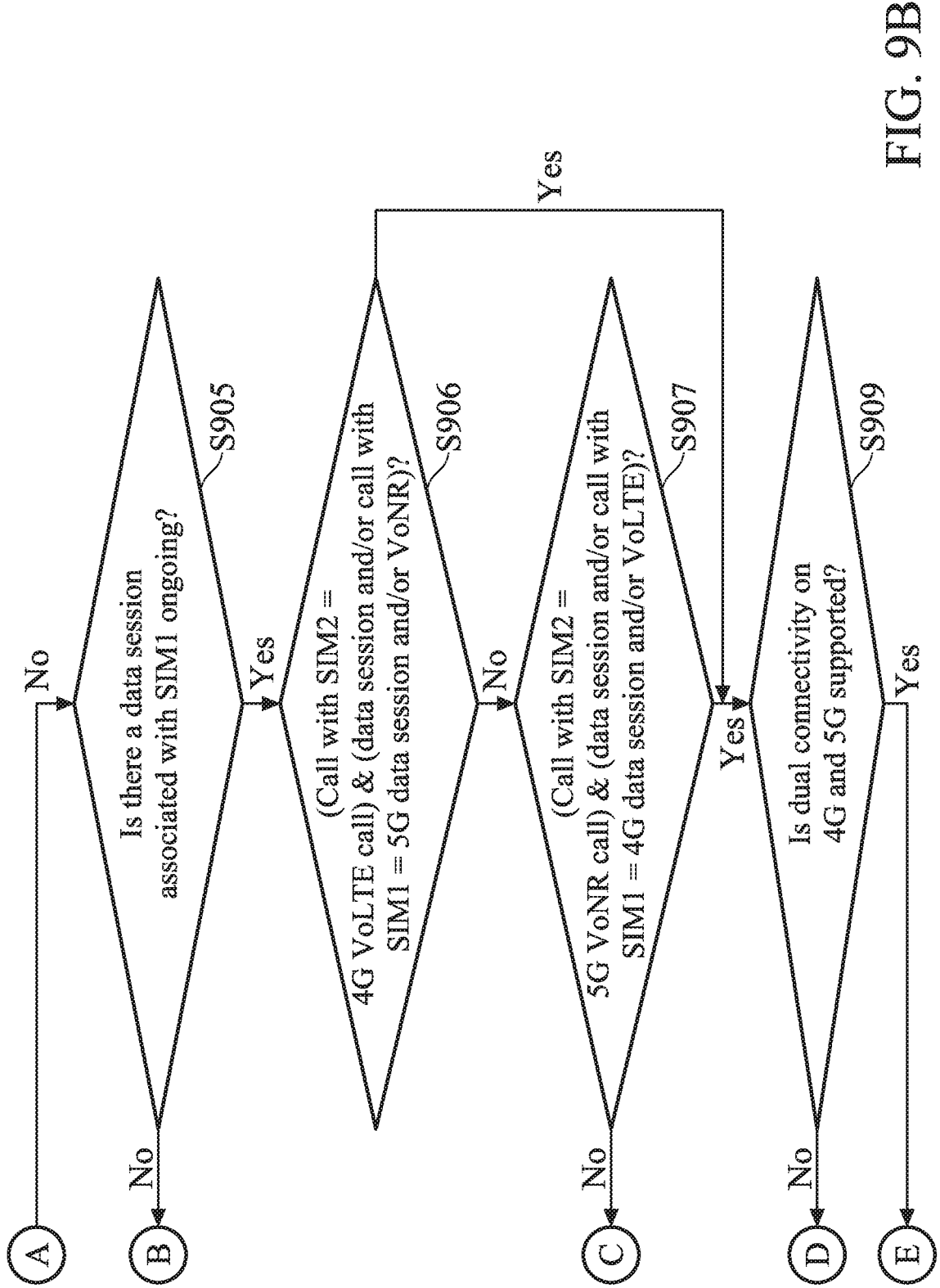

FIGS. 9A and 9B show a flow chart illustrating the method for supporting dual active of multiple subscriber identities according to an embodiment of the application.

In this embodiment, the method for supporting dual active of multiple subscriber identities may be applied to a mobile communication device equipped with two RF devices using different RATs.

To begin with, a request for using a subscriber identity (referred to herein as SIM2) to start a call is received (step S901). In response to the request, the mobile communication device determines whether there is a data session associated with SIM2 ongoing (step S902).

Subsequent to step S902, if a data session associated with SIM2 is ongoing, the mobile communication device allows the call to start during the data session (step S903), and then enters the single active mode with SIM2 being used for the call and the data session (step S904), and the method ends.

Subsequent to step S902, if no data session associated with SIM2 is ongoing, the mobile communication device determines whether there is a data session associated with another subscriber identity (referred to herein as SIM1) ongoing (step S905), and if not, the method proceeds to step S903. Otherwise, if a data session associated with SIM1 is ongoing, the mobile communication device determines whether the call associated with SIM2 is a 4G VoLTE call and the data session and/or call associated with SIM1 is a 5G data session and/or VoNR (step S906).

Subsequent to step S906, if the call associated with SIM2 is not a 4G VoLTE call or the data session associated with SIM1 is not a 5G data session, the mobile communication device determines whether the call associated with SIM2 is a 5G VoNR call and the data session and/or call associated with SIM1 is a 4G data session and/or VoLTE (step S907). To follow the 'No' branch of step S907, the mobile communication device interrupts the data session associated with SIM1 and allows the call associated with SIM2 to start (step S908), and the method proceeds to step S904.

Subsequent to steps S907 and S906, if the call associated with SIM2 and the data session associated with SIM1 are a 4G VoLTE call and a 5G data session, or a 5G VoNR call and a 4G data session, respectively, the mobile communication device determines whether dual connectivity on 4G and 5G is supported (step S909).

Subsequent to step S909, if dual connectivity on 4G and 5G is supported, the mobile communication device allows the call associated with SIM2 to start during the data session associated with SIM1 (step S910), and then enters the dual active mode with SIM2 being used for the call and SIM1 being used for the data session (step S911), and the method ends.

Subsequent to step S909, if dual connectivity on 4G and 5G is not supported, the method proceeds to step S908.

Figure 10A:
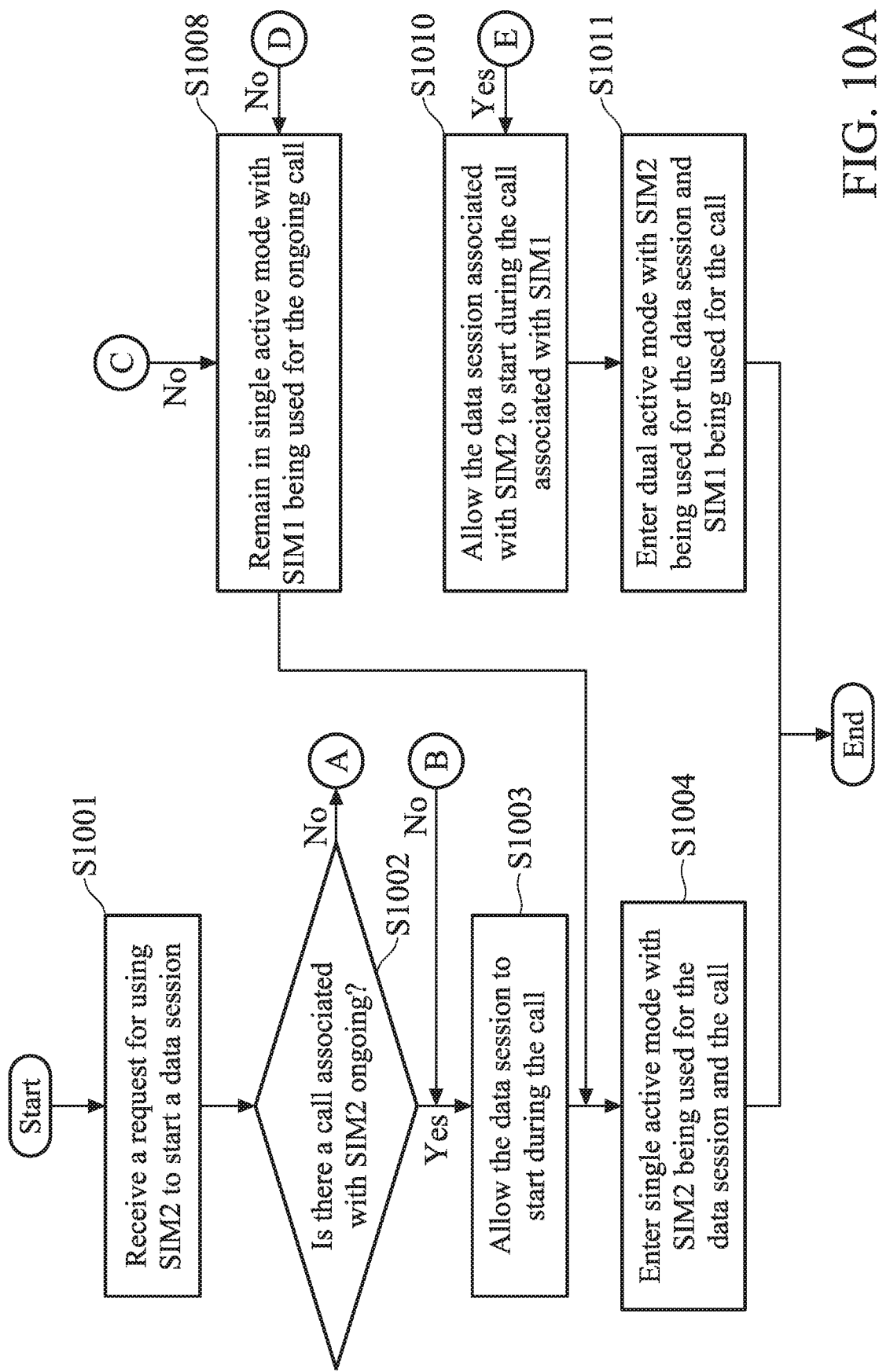
FIGS. 10A and 10B show a flow chart illustrating the method for supporting dual active of multiple subscriber identities according to another embodiment of the application.
Figure 10B:
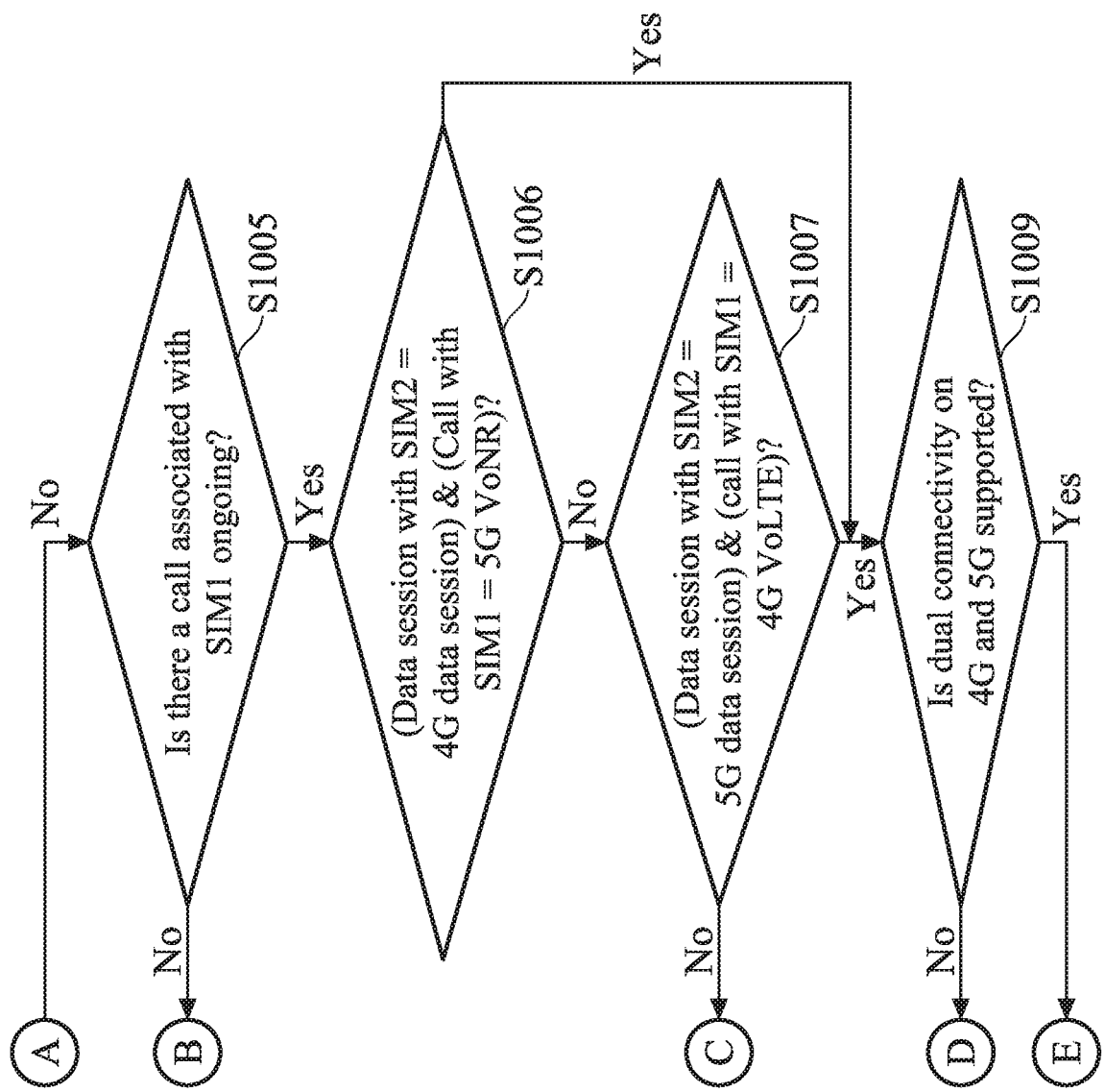

FIGS. 10A and 10B show a flow chart illustrating the method for supporting dual active of multiple subscriber identities according to another embodiment of the application.

In this embodiment, the method for supporting dual active of multiple subscriber identities may be applied to a mobile communication device equipped with two RF devices using different RATs.

To begin with, a request for using a subscriber identity (referred to herein as SIM2) to start a data session (e.g., a data call) is received (step S1001). In response to the request, the mobile communication device determines whether there is a call associated with SIM2 ongoing (step S1002).

Subsequent to step S1002, if a call associated with SIM2 is ongoing, the mobile communication device allows the data session to start during the call (step S1003), and then enters the single active mode with SIM2 being used for the data session and the call (step S1004), and the method ends.

Subsequent to step S1002, if no call associated with SIM2 is ongoing, the mobile communication device determines whether there is a call associated with another subscriber identity (referred to herein as SIM1) ongoing (step S1005), and if not, the method proceeds to step S1003. Otherwise, if a call associated with SIM1 is ongoing, the mobile communication device determines whether the data session associated with SIM2 is a 4G data session and the call associated with SIM1 is a 5G VoNR call (step S1006).

Subsequent to step S1006, if the data session associated with SIM2 is not a 4G data session or the call associated with SIM1 is not a 5G VoNR call, the mobile communication device determines whether the data session associated with SIM2 is a 5G data session and the call associated with SIM1 is a 4G VoLTE call (step S1007). To follow the 'No' branch of step S1007, the mobile communication device remains in the single active mode with SIM1 being used for the ongoing call (step S1008), and the method ends.

Subsequent to steps S1006 and S1007, if the data session associated with SIM2 and the call associated with SIM1 are a 4G data session and a 5G VoNR call, or a 5G data session and a 4G VoLTE call, respectively, the mobile communication device determines whether dual connectivity on 4G and 5G is supported (step S1009).

Subsequent to step S1009, if dual connectivity on 4G and 5G is supported, the mobile communication device allows the data session associated with SIM2 to start during the call associated with SIM1 (step S1010), and then enters the dual active mode with SIM2 being used for the data session and SIM1 being used for the call (step S1011), and the method ends.

Subsequent to step S1009, if dual connectivity on 4G and 5G is not supported, the method proceeds to step S1008.

Figure 11:
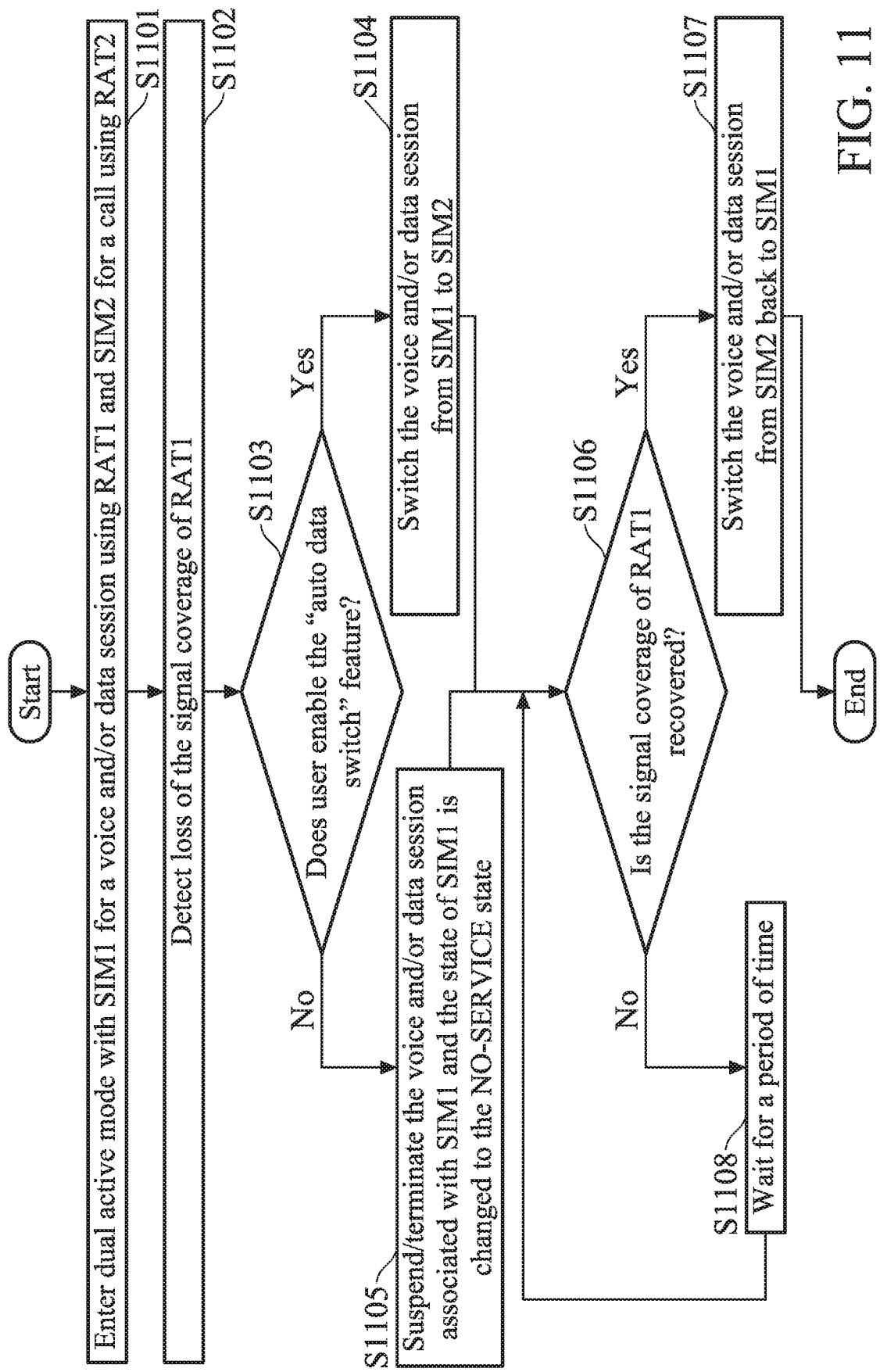
FIG. 11 is a flow chart illustrating switching a data session between two separate subscriber identities for a coverage loss in the dual active mode according to an embodiment of the application.

FIG. 11 is a flow chart illustrating switching a data session between two separate subscriber identities for a coverage loss in the dual active mode according to an embodiment of the application.

To begin with, the mobile communication device enters the dual active mode with SIM1 for a voice and/or data session using RAT1 and SIM2 for a call using RAT2 (step S1101). Next, the mobile communication device detects a loss of the signal coverage of RAT1 (step S1102), and in response, the mobile communication determines whether the user enables the "auto data switch" feature (step S1103).

Subsequent to step S1103, if the "auto data switch" feature is enabled, the mobile communication device switches the voice and/or data session from being conducted using SIM1 to being conducted using SIM2 (step S1104). That is, the voice and/or data session was conducted with SIM1 using RAT1, and is conducted with SIM2 using RAT2. Otherwise, if the "auto data switch" feature is not enabled, the mobile communication device suspends or terminates the voice and/or data session associated with SIM1 and the state of SIM1 is changed to the NO-SERVICE state (step S1105).

Subsequent to steps S1104 and S1105, the mobile communication device determines whether the signal coverage of RAT1 is recovered (step S1106). If the signal coverage of RAT1 is recovered, the mobile communication device switches the voice and/or data session from being conducted using SIM2 back to being conducted using SIM1 (step S1107). Otherwise, if the signal coverage of RAT1 is not recovered, the mobile communication device waits for a period of time (step S1108), and the method returns to step S1106.

In view of the forgoing embodiments, it will be appreciated that the present application realizes dual active of multiple subscriber identities in dual-card cellular phones, by leveraging the feature of EN-DC/NE-DC/NGEN-DC in a novel way that the dual connectivity with a 5G network and a 4G network for a single subscriber identity is divided into single connectivity with a 5G network for one subscriber identity and single connectivity with a 4G network for another subscriber identity.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A mobile communication device, comprising:
a first Radio Frequency (RF) device, configured to perform wireless transmission and reception utilizing a first Radio Access Technology (RAT);
a second RF device, configured to perform wireless transmission and reception utilizing a second RAT; and
a controller, configured to use a first subscriber identity to make a first call or conduct a first data session via the first RF device, determine whether a dual connectivity on the first RAT and the second RAT is supported in response to a request for using a second subscriber identity to start a second call or a second data session via the second RF device, and allow the second call or the second data session to start during the first call or the first data session in response to the dual connectivity on the first RAT and the second RAT being supported.

2. The mobile communication device of claim 1, wherein the dual connectivity on the first RAT and the second RAT is Evolved-Universal Terrestrial Radio Access (E-UTRA)-NR Dual Connectivity (EN-DC), NR-EUTRA Dual Connectivity (NE-DC), or Next Generation EN-DC (NGEN-DC), when the first RAT or the second RAT is a fifth generation (5G) cellular technology and the other of the first RAT or the second RAT is a fourth generation (4G) cellular technology.

3. The mobile communication device of claim 1, wherein the controller is further configured to allow the second call to preempt the first data session or not allow the second call or the second data session to start during the first call, in response to the dual connectivity on the first RAT and the second RAT not being supported.

4. The mobile communication device of claim 1, wherein the controller is further configured to switch an access type of the first subscriber identity with a currently registered network from Non-Standalone (NSA) to Standalone (SA) in response to the dual connectivity on the first RAT and the second RAT being supported.

5. The mobile communication device of claim 1, wherein, after allowing the second call or the second data session to start during the first call or the first data session, the controller is further configured to switch the first data session to be conducted using the second subscriber identity via the second RF device in response to the first RF device detecting no signal coverage of the first RAT, and switch the first data session back to be conducted using the first subscriber identity via the first RF device in response to the first RF device detecting a signal coverage of the first RAT.

6. The mobile communication device of claim 1, wherein, after allowing the second call or the second data session to start during the first call or the first data session, the controller is further configured to suspend or terminate the first data session in response to the first RF device detecting no signal coverage of the first RAT, and resume or restart the first data session in response to the first RF device detecting a signal coverage of the first RAT.

7. A method for supporting dual active of multiple subscriber identities, executed by a mobile communication device which comprises a first Radio Frequency (RF) device utilizing a first Radio Access Technology (RAT) and second RF device utilizing a second RAT, the method comprising:
using a first subscriber identity to make a first call or conduct a first data session via the first RF device;
determining whether a dual connectivity on the first RAT and the second RAT is supported in response to a request for using a second subscriber identity to start a second call or a second data session via the second RF device; and
allowing the second call or the second data session to start during the first call or the first data session in response to the dual connectivity on the first RAT and the second RAT being supported.

8. The method of claim 7, wherein the dual connectivity on the first RAT and the second RAT is Evolved-Universal Terrestrial Radio Access (E-UTRA)-NR Dual Connectivity (EN-DC), NR-EUTRA Dual Connectivity (NE-DC), or Next Generation EN-DC (NGEN-DC), when the first RAT or the second RAT is a fifth generation (5G) cellular technology and the other of the first RAT or the second RAT is a fourth generation (4G) cellular technology.

9. The method of claim 7, further comprising:
allowing the second call to preempt the first data session or not allowing the second call or the second data session to start during the first call, in response to the dual connectivity on the first RAT and the second RAT not being supported.

10. The method of claim 7, further comprising:
switching an access type of the first subscriber identity with a currently registered network from Non-Standalone (NSA) to Standalone (SA) in response to the dual connectivity on the first RAT and the second RAT being supported.

11. The method of claim 7, further comprising:
after allowing the second call or the second data session to start during the first call or the first data session,
switching the first data session to be conducted using the second subscriber identity via the second RF device in response to the first RF device detecting no signal coverage of the first RAT, and
switching the first data session back to be conducted using the first subscriber identity via the first RF device in response to the first RF device detecting a signal coverage of the first RAT.

12. The method of claim 7, further comprising:
after allowing the second call or the second data session to start during the first call or the first data session,
suspending or terminating the first data session in response to the first RF device detecting no signal coverage of the first RAT, and
resuming or restarting the first data session in response to the first RF device detecting a signal coverage of the first RAT.

13. A non-transitory computer-readable storage medium comprising computer program that, when executed, causes a mobile communication device comprising a first Radio Frequency (RF) device utilizing a first Radio Access Technology (RAT) and a second RF device utilizing a second RAT to perform a method for supporting dual active of multiple subscriber identities, wherein the method comprises:
using a first subscriber identity to make a first call or conduct a first data session via the first RF device;
determining whether a dual connectivity on the first RAT and the second RAT is supported in response to a request for using a second subscriber identity to start a second call or a second data session via the second RF device; and
allowing the second call or the second data session to start during the first call or the first data session in response to the dual connectivity on the first RAT and the second RAT being supported.

14. The non-transitory computer-readable storage medium of claim 13, wherein the dual connectivity on the first RAT and the second RAT is Evolved-Universal Terrestrial Radio Access (E-UTRA)-NR Dual Connectivity (EN-DC), NR-EUTRA Dual Connectivity (NE-DC), or Next Generation EN-DC (NGEN-DC), when the first RAT or the second RAT is a fifth generation (5G) cellular technology and the other of the first RAT or the second RAT is a fourth generation (4G) cellular technology.

15. The non-transitory computer-readable storage medium of claim 13, wherein the method further comprises:
allowing the second call to preempt the first data session or not allowing the second call or the second data session to start during the first call, in response to the dual connectivity on the first RAT and the second RAT not being supported.

16. The non-transitory computer-readable storage medium of claim 13, wherein the method further comprises:
switching an access type of the first subscriber identity with a currently registered network from Non-Standalone (NSA) to Standalone (SA) in response to the dual connectivity on the first RAT and the second RAT being supported.

17. The non-transitory computer-readable storage medium of claim 13, wherein the method further comprises:
after allowing the second call or the second data session to start during the first call or the first data session,
switching the first data session to be conducted using the second subscriber identity via the second RF device in response to the first RF device detecting no signal coverage of the first RAT, and
switching the first data session back to be conducted using the first subscriber identity via the first RF device in response to the first RF device detecting a signal coverage of the first RAT.

18. The non-transitory computer-readable storage medium of claim 13, wherein the method further comprises:
after allowing the second call or the second data session to start during the first call or the first data session, suspending or terminating the first data session in response to the first RF device detecting no signal coverage of the first RAT, and resuming or restarting the first data session in response to the first RF device detecting a signal coverage of the first RAT.

* * * * *